Nov. 9, 1943.  T. O. RUEB  2,334,039
FRICTION JOINT
Filed Jan. 27, 1941
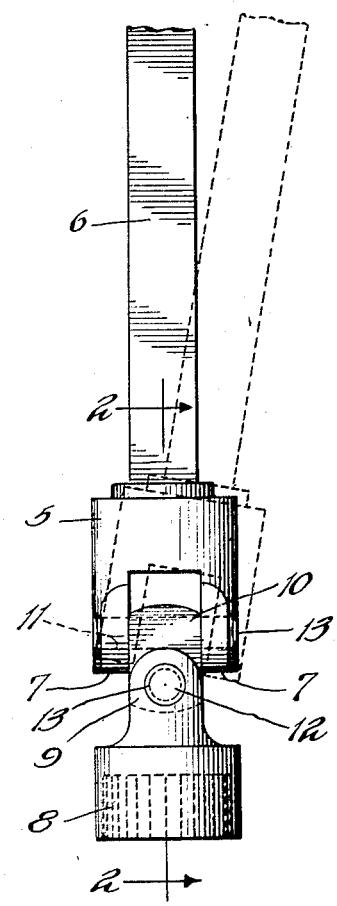
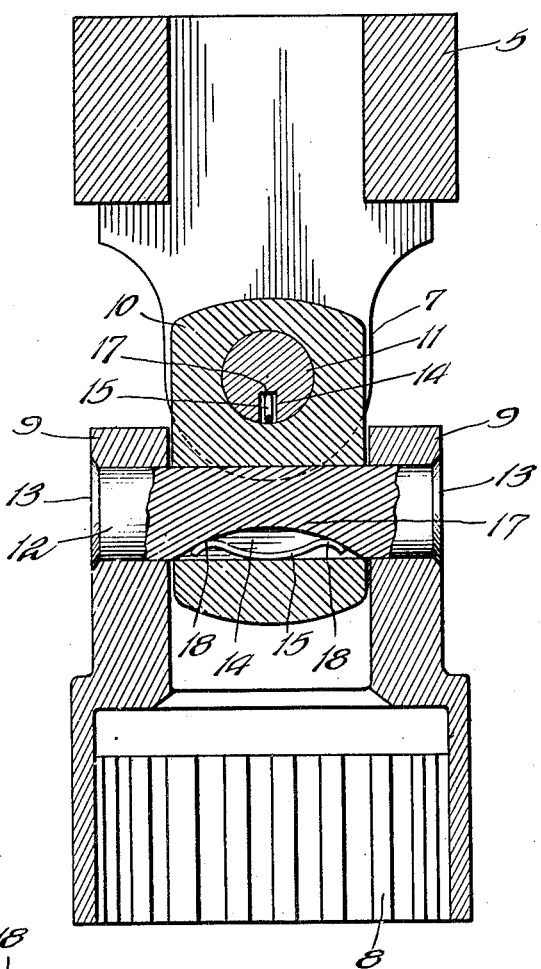
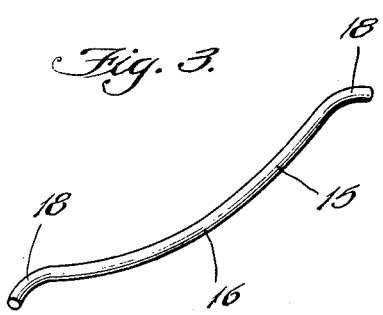
INVENTOR.
Theodore O. Rueb
BY Glenn S. Noble
ATTORNEY.

Patented Nov. 9, 1943

2,334,039

UNITED STATES PATENT OFFICE 2,334,039

FRICTION JOINT

Theodore O. Rueb, Chicago, Ill., assignor to The Sherman-Klove Co., Chicago, Ill., a corporation of Delaware Application January 27, 1941, Serial No. 376,169

5 Claims. (Cl. 64—17)

While this invention may be adapted for various uses, it is particularly applicable to universal joints such as commonly used for socket wrenches or other similar tools. Such universal joints have been in general use for many years and therefore do not need to be particularly described.

As usually made, the principal elements forming the joints are freely movable with respect to each other, the joint providing a convenient means for transmitting the power at the desired angles. However, when these joints are used for wrenches, it has been found desirable to provide more or less friction in order to prevent the free movement of some of the parts with respect to the others, whereby the joint members or parts associated therewith may be temporarily held in predetermined position as for engaging the wrench with a nut in an inaccessible position.

It has heretofore been proposed to provide such friction means between the main parts of the joint as, for instance, between the fork members and the connecting block, but I have found that this is objectionable as the fork members are apt to spread during the use of the wrench, and such friction as originally provided, is not sufficient to satisfactorily hold the elements in the desired positions. Furthermore, grease or oil may readily enter the spaces between such members and thereby reduce or eliminate the effect of the parts intended to produce friction.

The objects of this invention are to provide a friction joint having novel means for producing the desired friction; to provide a joint having pivot pins, or rivets with spring or yielding means for maintaining tension between the pin and one of the parts pivotally mounted thereon; to provide a universal joint having pivot pins, or rivets fixed or rigidly secured to the forks or bifurcated members and pivotally supporting the connecting block with means for pressing the pin against the bore of the block and to provide such other advantages and novel features as will be described hereinafter.

In the accompanying drawing illustrating this invention,

Fig. 1 is a side view of a universal joint embodying the same, shown as applied to a wrench bar, or the like;

Fig. 2 is an enlarged sectional view of the joint taken substantially on the line 2—2 of Fig. 1;

Fig. 3 is a perspective view of the spring.

The universal joint head or socket 5 is shown as being adapted to receive one end of a wrench bar 6, and is bifurcated to provide the usual forks or lugs 7. The coacting joint head or socket 8 is shown as being adapted to engage with a nut or the like at one end, and is also bifurcated at the opposite end to provide fork members or lugs 9. These forks are connected by means of the usual block 10 and pins or rivets 11 and 12 as shown. These pins or rivets have heads 13 and are tightly riveted in their respective forks so that they will be fixed therein and cannot turn.

In order to provide the desired or predetermined friction for the joint, my invention contemplates means for increasing the friction between the pins and the block or member which is rotatable with respect to the same. In the embodiment shown, each pin has a longitudinal slot 14, the bottom of which is preferably arcuate as when formed by means of a suitable milling tool. Tension springs 15 are positioned in these slots and coact with the pins and the block in such a manner as to press these parts towards each other. In the particular arrangement shown, the springs 15 are bent to provide central humps or curved portions 16 which engage with the inner walls of the holes through the blocks as clearly shown in Fig. 2. The ends 18 of the spring engage with the bottoms 17 of the grooves 14, the springs being flexed when inserted to provide the desired amount of tension and consequent friction between the coacting parts.

From this description, it will be apparent that the tension springs being interposed between the pins and the block will cause a large area of the surface of the pins to be pressed against the adjacent bores through the blocks, and thus create a substantial amount of friction necessary for the purposes described. Furthermore, the springs are substantially enclosed so that there is little possibility of the tension being diminished or lost on account of oil or grease entering the joint. It will also be noted that any spreading of the forks which may occur during the use of the joints, particularly when subjected to heavy strains, will not affect the friction provided in the joint.

While I have shown a preferred commercial form of my invention, it is apparent that the same may be modified as by changing the shape or mounting of the springs, or in other respects, in order to adapt the same for different purposes or different forms of joints, and therefore I do not wish to be limited to the particular kind as shown and described except as specified in the following claims in which I claim:

1. In a joint, the combination of a joint member having a fork, a rivet fixed in said fork, a block pivotally mounted on the rivet, a recess in the rivet opposed to the bore through the block, and a spring in said recess engaging with the rivet and the block and tending to press them together to increase the friction between said parts.

2. In a friction joint, the combination of a forked member, a pin extending through the fork and rigidly secured therein, a block positioned in the fork and having a bore engaging closely with the pin, said pin having a longitudinal slot in the periphery thereof which is shorter than the width of the block whereby the slot is covered by the bore of the block, and a spring positioned in the slot and pressed against the bottom of the slot and the bore of the block for the purposes described.

3. A joint of the character set forth comprising a forked element, a block embraced by said forked element having a bore therethrough, a pin extending through said bore and rigidly secured to the fingers of the forked element, and spring means between the bore and the pin to urge the pin into increased frictional engagement with the bore which will tend to prevent rotation of the pin in the block.

4. A universal joint comprising forked end members, pins extending through the forks and rigidly secured therein, an intermediate block having bores receiving the respective pins, and spring means between each pin and its respective bore of the block tending to press the pin and the block together to increase the friction therebetween.

5. In a universal coupling, the combination of a pair of opposed forked members, a connecting block between said forked members, pivot pins non-rotatably secured to the respective forked members pivotally mounted in the respective bores in the connecting block, and spring means interposed between each pin and its respective bore in the block, normally urging each of said pins laterally against the surface of its bore to maintain substantial friction therebetween.

THEODORE O. RUEB.